United States Patent [19]

Yamada

[11] Patent Number: 5,598,766

[45] Date of Patent: Feb. 4, 1997

[54] CONTROL CIRCUIT FOR AN AUTOMATIC COOKING APPARATUS

[75] Inventor: Yoshimasa Yamada, Mie, Japan

[73] Assignee: Fuji Electric Co., Ltd., Kawasaki, Japan

[21] Appl. No.: 650,307

[22] Filed: May 20, 1996

[30] Foreign Application Priority Data

May 24, 1995 [JP] Japan .................. 7-124677

[51] Int. Cl.⁶ .................. A47J 37/00; A23P 1/00
[52] U.S. Cl. .................. 99/331; 99/337; 99/450.6; 219/494; 219/497; 392/324
[58] Field of Search .................. 99/325–335, 337, 99/338, 450.1–450.8, 494; 219/428, 492, 494, 497, 710, 757, 216; 364/400; 392/324; 426/512, 523

[56] References Cited

U.S. PATENT DOCUMENTS

| | | | |
|---|---|---|---|
| 3,599,864 | 8/1971 | Liddle | 219/492 X |
| 3,901,137 | 8/1975 | Jimenez | 99/353 |
| 4,516,487 | 5/1985 | Madison et al. | 99/450.6 |
| 4,582,970 | 4/1986 | Myoji | 219/715 |
| 4,672,180 | 6/1987 | Kusunoki et al. | 219/494 |
| 4,751,876 | 6/1988 | Escamilla | 426/512 X |
| 4,760,231 | 7/1988 | Hayashi | 219/688 |
| 5,073,758 | 12/1991 | Postlewait et al. | 219/497 X |
| 5,085,138 | 2/1992 | Fehr et al. | 99/450.6 |
| 5,235,148 | 8/1993 | Yamaguchi et al. | 99/331 |
| 5,404,214 | 4/1995 | Yoshimoto et al. | 219/216 X |
| 5,408,917 | 4/1995 | Lussi | 392/324 X |
| 5,531,156 | 7/1996 | Brummett | 99/450.6 |

Primary Examiner—Timothy F. Simone
Attorney, Agent, or Firm—Kanesaka & Takeuchi

[57] ABSTRACT

An automatic cooking apparatus includes a plurality of mechanisms for supplying, based on input data, plural kinds of food stuffs to cook various foods. A control circuit for the automatic cooking apparatus is formed of an operating device for operating the plurality of mechanisms, a first DC power supply connected to a utility power supply for supplying electric power to the operating device, a driving device for controlling the operating device, and a second DC power supply connected to the utility power supply supplying electric power to the driving device. Even if a noise voltage is generated in either the operating device or the driving device, the noise voltage is not supplied to the other of the operating device or the driving device.

5 Claims, 2 Drawing Sheets

CONTROL CIRCUIT FOR AN AUTOMATIC COOKING APPARATUS

BACKGROUND OF THE INVENTION AND RELATED ART STATEMENT

The present invention relates to a control circuit for an automatic cooking apparatus which automatically cooks, for example, tacos and such food items by supplying various food stuffs processed previously.

In a conventional automatic cooking apparatus according to the prior art, electric power for actuating multiple operating means for supplying the previously processed food stuffs and electric power for operating driving means for driving the operating means are obtained from a common DC power supply obtained by rectifying an AC electric current.

Relays, solenoids, step motors as operating means in the conventional automatic cooking apparatus generate steep noise voltages, especially when they stop operation. The noise voltage is superimposed on a voltage of the common DC power supply to cause malfunction of the driving means.

Further, it is required to take various safety measures, such as interrupting the operating means and preventing human hands from touching any current path of the operating means when a door of the cooking apparatus is opened. However, since a DC power supply is commonly used, the interrupting operation conducted by the driving means becomes complicated. And, additional means for covering the current path complicates the structure of the cooking apparatus.

in view of the foregoing, it is an object of the invention to provide a control circuit for an automatic cooking apparatus, wherein the control circuit overcomes the above described drawbacks in the conventional automatic cooking apparatuses.

SUMMARY OF THE INVENTION

According to one aspect of the present invention, there is provided a control circuit for an automatic cooking apparatus including a plurality of mechanisms for supplying, based on input data, plural kinds of food stuffs to cook various foods, operating means for operating the plurality of mechanisms for supplying, and driving means for driving the operating means. The control circuit includes a first DC power supply for supplying electric power to the operating means, and a second DC power supply for supplying electric power to the driving means.

According to another aspect of the present invention, there is provided a control circuit for an automatic cooking apparatus including a plurality of mechanisms for supplying, based on input data, plural kinds of food stuffs to cook various foods, and a plurality of doors in the automatic cooking apparatus. The control circuit comprises operating means for operating the plurality of mechanisms for supplying; a first DC power supply for supplying electric power to the operating means; driving means for driving the operating means; a second DC power supply for supplying electric power to the driving means; power supply operating means for turning off the first DC power supply when one of a plurality of doors is opened, and for turning on the first DC power supply when the one of the doors is closed; and control means for controlling the driving means based on the operation of the power supply operating means.

By providing the operating means and the driving means with the respective power supplies, the driving means is prevented from malfunctions caused by a noise voltage, since the noise voltage generated from the operating means is not added onto the electric power from the second DC power supply for the driving means.

By interrupting power supply from the first DC power supply to the operating means when a door of the automatic cooking apparatus is opened, memorizing the operating state at the instance of the interruption, and resuming the operation of the operating means from the state of the opening of the door, simple interrupting operation of the driving means can be made. And, the operating means is safe against electrification, since the electric power is not fed to the operating means while the first DC power supply is OFF.

DETAILED DESCRIPTION OF PREFERRED EMBODIMENT

Now, the present invention will be explained hereinafter by way of an automatic tacos cooking apparatus with reference to the accompanied drawings which illustrate the preferred embodiment of the invention.

Figure 1:
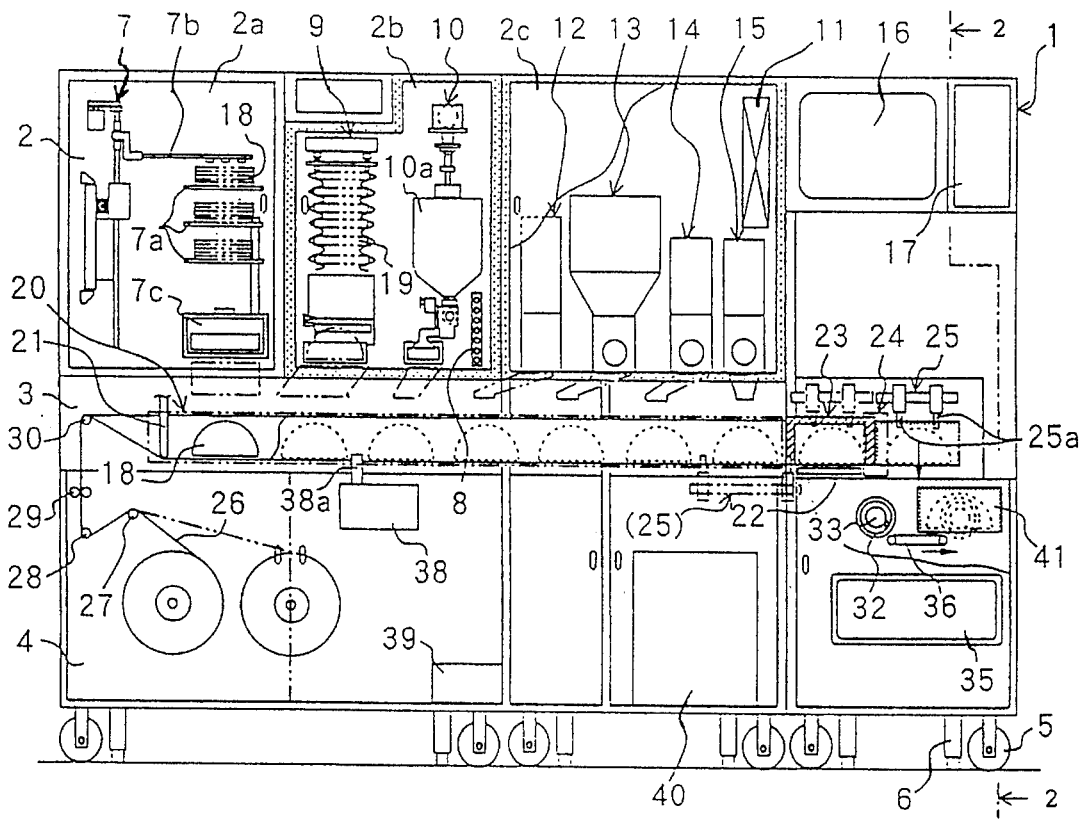
FIG. 1 is a front view of a tacos automatic cooking apparatus, to which the present invention is applied.
Figure 2:
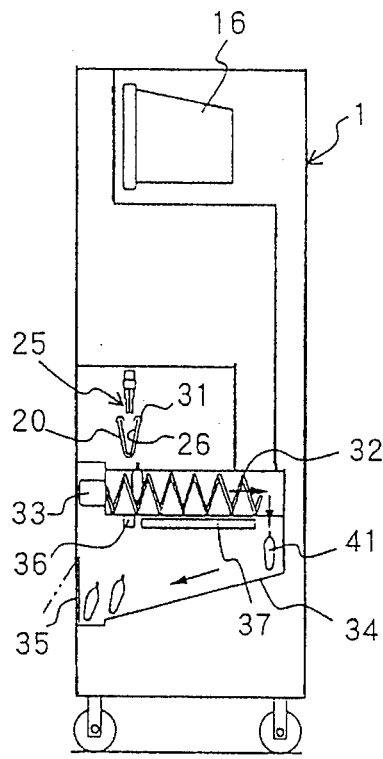
FIG. 2 is a cross sectional view taken along line 2—2 in FIG. 1.

FIG. 1 is a front view of a tacos automatic cooking apparatus to which the present invention is applied. FIG. 2 is a cross sectional view taken along line 2—2 in FIG. 1. Referring to FIG. 1, the automatic cooking apparatus is housed in a box-shaped steel cabinet 1. The cabinet 1 is generally divided into a food material storage space 2 at an upper part, a cooking space 3 at an intermediate part, and a utility space 4 at a lower part. The food material storage space 2 and the utility space 4 are divided into several small rooms. Although a front portion of each room is closed with a door, the cooking space 3 communicates throughout a substantially whole length of the cabinet 1 and is opened at a front portion. The cabinet 1 is separated into three parts for convenience of carrying or disposing, and each part has casters 5. In an installed condition as shown in the figures, the cabinet 1 is slightly lifted up by jacks 6 to be positioned.

In the food material storage space 2, three rooms 2a, 2b, 2c are defined, and the rooms 2b and 2c are heat-insulated. A tortilla storing and delivery mechanism 7 is disposed in the room 2a at a room temperature, and a taco shell storing and delivery mechanism 9 and a ground meat storing and delivery mechanism 10 are arranged in the room 2b heated by a heater 8 at about 74° C. Further, in the room 2c cooled by a cooling device 11 at about 4° C., there are arranged a sour cream storing and delivery mechanism 12, a lettuce storing and delivery mechanism 13, a cheese storing and delivery mechanism 14, and a tomato storing and delivery mechanism 15. A right upper part of the cabinet adjacent to the room 2c is used as a control room. In the control room, there are arranged an operation display 16 with a touch panel at a front surface thereof, and a main controller 17.

The detail structures of the stuff storing and delivery mechanisms 7, 9, 10, 12, 13, 14 and 15 are not illustrated in the figures, which are explained in U.S. patent application Ser. No. 08/603,249. The substantial actuation principles of these mechanisms are explained below. The tortilla storing and delivery mechanism 7 has three shelves 7a, and tortillas 18 used as shells for tacos are piled up on the shelves 7a and stored. The tortilla 18 is prepared by baking a mixture of flour and water into a circular disc of, for example, 180 mm in diameter and 2 mm in thickness.

In a transfer process of the tortilla 18, the tortilla 18 is sucked by a sucking disc arranged at a distal end of an arm 7b moved vertically and horizontally with a feed screw, so that the tortilla 18 is taken out one by one and inserted into a heating device 7c. The heating device 7c has a pair of upper and lower horizontal electro-thermal plates heated all the time, and the tortilla 18 inserted into the heating device 7c is sandwiched by the electro-thermal plates to be heated instantaneously. Thereafter, the heated tortilla 18 is pushed along its center line to be folded in half by a plate type pusher (not shown) moving vertically through a slit arranged at the center of the electro-thermal plates. The folded tortilla 18 is further pushed downwardly and falls in this posture through a chute.

A taco shell 19 is prepared by baking a cornmeal or the like mixed with liquid into a circular shape, and further deep-frying this baked shell folded in half to become hard. The taco shell 19 has, for example, the diameter of about 150 mm and the thickness of 1 mm. The taco shell storing and delivery mechanism 9 has a plurality of shelf plates horizontally supported by spiral wires to be transferred downwardly from the top. About ten sheets of the folded taco shells 19 are piled and laid down on each shelf such that the folded portions thereof face to the front.

In the front part of the cooking space 3, an elongated wrapping paper guide 20, which is made of stainless steel and has a V-shape in cross section, is arranged horizontally (FIG. 2). A round rod 21 with a diameter of 10 mm, which has a function to fold a wrapping paper in a V-shape as described later, is disposed vertically at a wrapping paper entrance in a left end of FIG. 1. A round distal end of the rod faces the bottom of the wrapping paper guide 20 in a space of about 0.1 mm. Also, so as to continue to a wrapping paper exit side of the wrapping paper guide 20, in the right end of FIG. 1, a flat receiving plate 22 is disposed at the same level as the bottom of the wrapping paper guide 20. And, in the upper side of the receiving plate, a wrapping paper sealing mechanism 23, which is shown as a gate-shaped pushing frame, is disposed. Adjacent to the wrapping paper sealing mechanism 23, a wrapping paper cutting mechanism 24 is disposed as shown by a chain line in FIG. 1. At the upper side of the mechanisms 23 and 24, there is provided a wrapping paper transferring mechanism 25 driven by an air cylinder to move reciprocally in the lateral directions between a position shown by a chain line and a position shown by a solid line.

At the left end of the utility space 4 in FIG. 1, a roll of tape-like wrapping paper 26 is rotatably supported. The wrapping paper 26 is, for example, a fine white paper having the width of 260 mm and the thickness of 45 μm, and a pressure sensitive type adhesive for adhering when pressed is spread all over the outer side of the roll. The wrapping paper 26 is first guided around two guide rollers 27 and 28, and while passing through feed rollers 29 driven by a motor, the paper 26 is turned around a guide roller 30 and is lead to a V-shape space of the wrapping paper guide 20. The wrapping paper 26 is plain until exiting from the guide roller 30, but after exiting from the guide roller 30, the wrapping paper is gradually changed into a V-shape along a center line of the wrapping paper. When entering into the wrapping paper guide 20, the wrapping paper is folded along a cross sectional shape of the wrapping paper guide 20, and advanced to a right side in FIG. 1 of the wrapping paper guide 20 through a space between the rod 21 and the bottom inner face of the wrapping paper guide 20. Furthermore, two rolls of the wrapping paper 26 are disposed side by side, so that when one of the rolls is run out, the other roll is immediately replaced.

Folding the wrapping paper 26 to change the shape thereof and introducing the wrapping paper 26 into the wrapping paper guide 20, as described above, are manually done before the apparatus starts operation. Namely, the wrapping paper 26 is guided to the guide roller 30, and then, the distal end of the wrapping paper 26 is held between the operator's fingers to change the shape of the wrapping paper 26 into a V-shape. Then, the paper 26 is introduced into the wrapping paper guide 20 while passing under the rod 21, and is pulled to the right side so that the distal end of the wrapping paper 26 overlaps the wrapping paper sealing mechanism 23. Meantime, the wrapping paper 26 is pressed by the distal end of the rod 21 along the center line of the wrapping paper to be folded into a V-shape and fitted in an inner wall of the wrapping paper guide 20 while advancing along the wrapping paper guide 20. Although right and left upper ends of the wrapping paper 26 are situated slightly lower than the wrapping paper guide 20, in order to prevent the wrapping paper 26 from protruding from the wrapping paper guide 20, U-shape caps 31 are attached to the right and left upper ends of the wrapping paper guide 20, as shown in FIG. 2.

In the right end part of the utility space 4, right and left spiral wires 32 are disposed horizontally to the front and rear directions, and each spiral wire is activated to rotate by a motor 33 (FIG. 2). As shown in FIG. 2, front sides of the spiral wires 32 are located under the wrapping paper guide 20, and rear sides of the spiral wires 32 are located above an upper part of a chute 34 sloping forwardly. The chute 34 communicates with a product delivery outlet 35 having a flap opening forwardly. Also, exactly under the wrapping paper guide 20, a narrow belt conveyer 36 is disposed adjacent to the lower surfaces of the spiral wires to extend horizontally to the right and left directions over the right and left spiral wires 32. Behind the belt conveyer 36, a receiving plate 37 is disposed horizontally to the front and rear directions adjacent to the lower surface of the spiral wire 32. The utility space 4 further receives a lower part sealing mechanism 38, a terminal controller 39, and a freezing unit 40 for providing freezing media to the cooling device 11, which are described later.

Explanation of the structure is finished hereupon, and explanation of the operation is described below. The apparatus is operated by touching a displayed picture in a display 16 so as to designate a food in a menu and the number of the food to be prepared. The food or order is selected as to whether the tortilla 18 (soft tacos) is used or the taco shell 19 (hard tacos) is used, and what combination of various stuffs is filled in. When the apparatus starts operation, one sheet of the folded shell (the tortilla 18 or taco shell 19) is supplied from the tortilla storing and delivery mechanism 7 or taco shell storing and delivery mechanism 9 into the inner side of the V-shape wrapping paper guide 26 located in the wrapping paper guide 20. Here hypothetically, the tortilla 18 is supplied into the wrapping paper 26 for explanation.

Then, the lower part sealing mechanism 38 seals the wrapping paper 26 in a predetermined way. Namely, the lower part sealing mechanism 38 seals a folded portion of the wrapping paper 36 at the front and rear of the shell placed in the wrapping paper 26, i.e. between the shells adjacent to each other, wherein a sealed portion has, for example, the height of 10 mm from the bottom of the folded portion and the width of 10 mm. Through a cutout portion (not shown) in the wrapping paper guide 20, clamps 38a press the folded portion of the wrapping paper 26 from the right and left sides to join the facing sheet surfaces of the wrapping paper 26 thereat. As a result, there are provided partitions in the wrapping paper 26 at the front and rear of the shell, so that when a part of the stuffs supplied to the shell is dropped from the shell, the dropped stuff is prevented from entering into an adjacent shell area.

After all the stuffs are supplied to the shell, the wrapping paper sealing mechanism 23 seals a joint portion of the wrapping paper at the periphery of the completed taco. Namely, the wrapping paper 26 projecting from the right side of the wrapping paper guide 20 in FIG. 1 and supported by the receiving plate 22 is pressed by a pair of right and left gate-shaped pushing frames opened and closed by an air cylinder, so that the facing sheets of the wrapping paper 26 at the joint portion are joined in a gate shape.

After the aforementioned sealing by the sealing mechanism 23, the feed rollers 29 rotate for a predetermined time to send out a predetermined amount of the wrapping paper 26 from the roller. Also, the wrapping paper transferring mechanism 25 moves from the position shown by the solid line in FIG. 1 to the position shown by the chain line in FIG. 1, holds the upper end part of the sealed wrapping paper 26 by the clamps 25a to move back to the position shown by the solid line, and releases the upper end. Therefore, the wrapping paper 26 in the wrapping paper guide 20 is advanced stepwise for a predetermined stroke, for example, 230 mm. After the movement of the wrapping paper 26 is finished, the wrapping paper cutting mechanism 24 is activated to cut the wrapping paper 26 for the length of the aforementioned stroke.

After starting operation of the apparatus, the wrapping paper 26 is sealed and cut without any taco until the first completed taco reaches the wrapping paper sealing mechanism 23. The wrapping paper cutting mechanism 24 has a pair of moving blades perpendicular to both sides of the wrapping paper 26, so that when the cutting mechanism is operated, these blades approach towards each other to cut the wrapping paper 26.

When the machine is continuously operated, while the wrapping paper 26 is being cut, the predetermined amount of the ground meat is supplied from the ground meat storing and delivery means 10 into the inner side of the tortilla 18 placed in the wrapping paper 26. For the hard taco, immediately after the taco shell 19 is fed, the ground meat is supplied into the taco shell as a next step. However, for the soft taco, the ground meat is supplied at two steps after the tortilla 18 is fed. Such an empty step is formed when the stuffs are selectively supplied, and the operation is controlled on menu data inputted in advance. After the supply is finished, the wrapping paper transferring mechanism 25 advances the wrapping paper 26 for one step, and immediately after the wrapping paper is advanced, the wrapping paper is sealed by the wrapping paper sealing mechanism 23. Then, the distal end of the wrapping paper 26 is cut by the wrapping paper cutting mechanism 24.

Before sealing by the sealing mechanism 23, a predetermined amount of the sour cream is supplied from the sour cream storing and delivery mechanism 12 into the tortilla 18 in the wrapping paper 26, and a next tortilla 18 is provided from the tortilla storing and delivery mechanism 7 into the wrapping paper 26. By repeating these processes, the tortillas 18 are supplied one by one from the tortilla storing and delivery mechanism 7, and the necessary stuffs according to the menu are supplied into these tortillas 18 from each of the stuff storing and delivery mechanisms 10, 12, 13 and 14, in order. After the stuffs are supplied, the taco reaches the wrapping paper sealing mechanism 23 to be sealed. Sequentially, the partition between one taco and next taco is cut by the wrapping paper cutting mechanism 24, so that a product 41, i.e. the taco covered by the V-shape wrapping paper cut into the length of 230 mm and sealed in the gate-shape at the periphery of the taco, is completed.

When the wrapping paper 26 is cut, the product 41 falls down and is received by the belt conveyer 36. When perceiving the product 41 by means of a sensor (not shown), the belt conveyer 36 distinguishes between the hard taco and the soft taco by the menu data or order inputted before, and rotates toward right or left to send the product to either the right or left spiral wire 32. In case the product is the soft taco and is sent to the right spiral wire 32, the spiral wire 32 rotating continuously transfers the product 41 toward the back of the apparatus as shown by an arrow in FIG. 2, so that the product 41 is dropped down on the chute 34 from the back end of the spiral wire 32. As shown in FIG. 2, the product 41 slides down on the chute 34 to reach the product delivery outlet 35, and is taken out and handed to the customer. In case the product 41 is the hard taco, the operating movement is the same as in the soft taco, except that the taco shell 19 is firstly supplied instead of the tortilla. The hard taco may be delivered through the left spiral wire to the delivery outlet 35.

In FIG. 1, the wrapping paper transferring mechanism 25 is arranged to hold the upper end of the wrapping paper 26 after sealed. However, as shown by the chain line in FIG. 1, when the wrapping paper transferring mechanism 25 is disposed under the wrapping paper guide 20 to hold the folded portion of the wrapping paper 26 and to advance the wrapping paper 26 consecutively, the wrapping paper 26 can be transferred further smoothly. In this case, a cutout or hole for escaping the reciprocal movement of the clamp 25a is formed at the wrapping paper guide 20.

In the automatic cooking apparatus for the taco as described above, since the shell and stuffs are supplied as the wrapping paper is advanced stepwise or consecutively and the products are continuously sent from the final stage of the process, the product efficiency is excellent and the tacos are produced at high speed, i.e. one taco in four seconds. Also, the amount of the stuffs to be supplied is accurately fixed. Further, the staffs are supplied into the shell on the wrapping paper, so that the dropped stuffs remain on the wrapping paper and are not scattered in the working space. Furthermore, since the stuffs are not directly touched by one's hands, it is hygienic.

Figure 3:
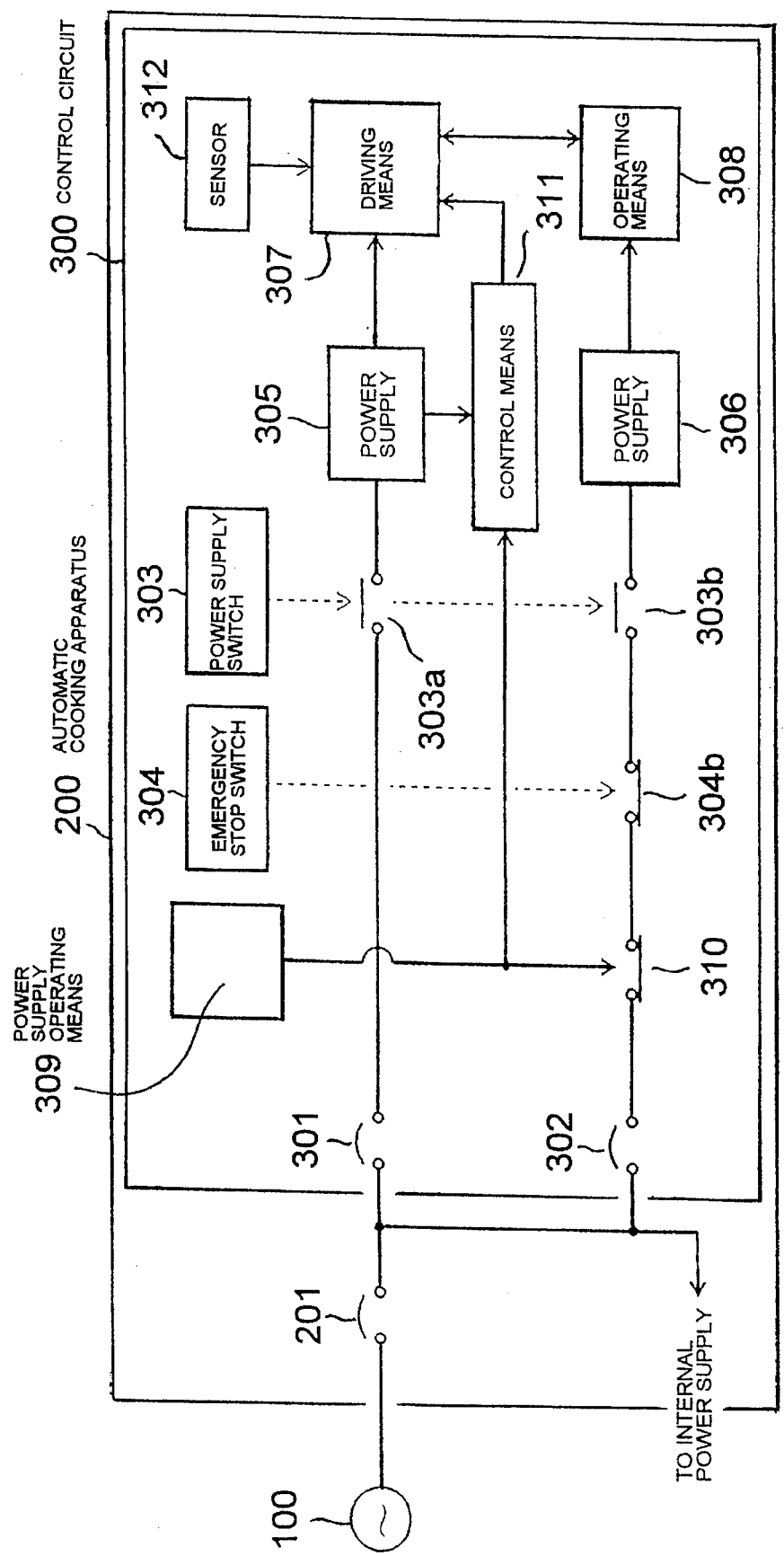
FIG. 3 is a block diagram showing an embodiment of a control circuit for an automatic cooking apparatus according to the present invention.

FIG. 3 is a block diagram showing an embodiment of a control circuit for an automatic cooking apparatus according to the present invention. In FIG. 3, a utility power supply 100, an automatic cooking apparatus 200, a control circuit 300, and a main circuit beaker 201 are shown.

The control circuit 300 includes a control-side circuit breaker 301; an actuation-side circuit breaker 302; a power supply switch 303; an emergency stop switch 304 for stopping operation of the automatic cooking apparatus 200 when the automatic cooking apparatus 200 operates abnormally; a power supply 305 as a DC power supply for the control-side; a power supply 306 as a DC power supply for the actuation-side; driving means 307 inclusive of a CPU, memories, the operation display 16 of FIG. 1, etc.; operating means 308 for operating the stuff storing and delivery mechanisms 7, 9, 10, 12, 13, 14 and 15, inclusive of relays, solenoids, stepping motors, arm robots, etc.; power supply operating means 309 for detecting opening and closing of the doors of the automatic cooking apparatus 200 to disconnect or connect the input side of the power supply 306; a switch 310 for connecting or disconnecting the power supply 306 based on the output of the power supply operating means 309; control means 311 for commanding the operation of the driving means 307 based on the output of the power supply operating means 309; and sensors 312, such as thermistors, limit switches, thermostats, etc. for detecting the states of the automatic cooking apparatus 200.

By making the power supply switch 303 ON in the state that the main circuit beaker 201, the control-side circuit breaker 301 and the actuation-side circuit breaker 302 are ON, the contacts 303a and 303b are closed, and AC electric power from the utility power supply 100 is fed to the power supplies 305 and 306. The power supplies 305 and 306 rectify and smooth the AC electric power from the utility power supply 100, and output regulated DC voltages.

Due to the above described circuit configuration, each of the power supplies 305 and 306 causes almost negligible disturbance to the counter part power supply 306 or 305 even when a noise voltage is generated in the load of each power supply 305 or 306. By separating the cable wiring on the side of the power supply 306 and the operating means 308 from the cable wiring on the side of the power supply 305, the driving means 307, the control means 311 and the sensors 312, malfunctions are completely expelled from the driving means 307.

Further more, the power supply operating means 309, which has detected opening of either one of the doors of the automatic cooking apparatus, makes the switch 310 OFF so that a voltage is not outputted from the power supply 306. The driving means 307 stores, through the control means 311, the state at the instance of this voltage output interruption and waits. When the door is closed, the switch 310 is again made ON by the power supply operating means 309 to resume the normal voltage output from power supply 306, and the operating means 308 resumes its operation from the state that the driving means 307 has stored.

According to an aspect of the invention, the driving means is prevented from malfunctioning caused by a noise voltage by providing the operating means and the driving means with the respective individual power supplies and by separating the load-side wiring cables of the operating means and the driving means.

According to another aspect of the invention, the power supply for the operating means is made OFF when a door of the automatic cooking apparatus is opened, and the operation of the operating means is resumed from the state of the opening of the door. Since electric power is not supplied to the operating means while the power supply for the operating means is OFF, the operating means is safe against electrification.

What is claimed is:

1. A control circuit for an automatic cooking apparatus including a plurality of mechanisms for supplying, based on input data, plural kinds of food stuffs to cook various foods, the control circuit comprising:

operating means for operating said plurality of mechanisms;

a first DC power supply connected to a utility power supply, said first DC power supply supplying electric power to said operating means;

driving means for controlling said operating means; and a second DC power supply connected to the utility power supply, said second DC power supply supplying electric power to said driving means so that if a noise voltage is generated in one of the operating means and the driving means, the noise voltage is not supplied to the other of the operating means and the driving means.

2. A control circuit according to claim 1, further comprising, power supply operating means connected to the first DC power supply, said power supply operating means turning off said first DC power supply when one of a plurality of doors for the automatic cooking apparatus is opened and turning on said first DC power supply when said one of the plurality of the doors is closed; and control means connected to said power supply operating means and said driving means, said control means actuating the driving means such that when the first DC power supply is turned off and is turned on again, the driving means actuates the operating means to resume operation at a time of interruption of the first DC power supply.

3. A control circuit according to claim 1, wherein said operating means includes motors and relays for actuating food stuff storing and delivery mechanisms, and said driving means includes a CPU and a memory for operating the operating means.

4. A control circuit according to claim 2, wherein said control means is electrically connected to the second DC power supply.

5. A control circuit according to claim 4, further comprising a power switch connected to the first and second DC power supplies for turning on and off the first and second DC power supplies, and an emergency switch connected to the first DC power supply for turning on and off the first DC power supply.

* * * * *

UNITED STATES PATENT AND TRADEMARK OFFICE
CERTIFICATE OF CORRECTION

PATENT NO.   : 5,598,766
DATED        : February 4, 1997
INVENTOR(S)  : Yoshimasa Yamada It is certified that error appears in the above-indentified patent and that said Letters Patent is hereby corrected as shown below:

In column 1, line 19, before "step" add --and--; and
            line 33, change "in view of" to --In view of--.

In column 3, line 31, change "face to the front" to
            --face the front--; and
            line 62, change "is lead" to --is led--.

In column 4, line 61, change "26" to --20--; and
            line 67, change "36" to --26--.

Signed and Sealed this

Thirteenth Day of May, 1997

Attest:

BRUCE LEHMAN

Attesting Officer

Commissioner of Patents and Trademarks